(12) United States Patent
Nakayama

(10) Patent No.: US 10,020,484 B2
(45) Date of Patent: Jul. 10, 2018

(54) CELL WIRING MODULE

(71) Applicants: AUTONETWORKS TECHNOLOGIES, LTD, Mie (JP); SUMITOMO WIRING SYSTEMS, LTD., Mie (JP); SUMITOMO ELECTRIC INDUSTRIES, LTD., Osaka (JP)

(72) Inventor: Osamu Nakayama, Mie (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 0 days.

(21) Appl. No.: 15/206,716

(22) Filed: Jul. 11, 2016

(65) Prior Publication Data

US 2016/0322625 A1 Nov. 3, 2016

Related U.S. Application Data

(63) Continuation of application No. 14/114,807, filed as application No. PCT/JP2012/064264 on Jun. 1, 2012.

(30) Foreign Application Priority Data

Jul. 5, 2011 (JP) .................................. 2011-149075

(51) Int. Cl.
*H01M 2/20* (2006.01)

(52) U.S. Cl.
CPC ........ *H01M 2/206* (2013.01); *H01M 2220/20* (2013.01)

(58) Field of Classification Search
CPC ........ H01M 2/20; H01M 2/00; H01M 2/1011; H01M 2/202; H01M 2/206; H01M 2/1077; H01M 2220/20
See application file for complete search history.

(56) References Cited

U.S. PATENT DOCUMENTS

| 5,804,770 A * | 9/1998 | Tanaka | H01M 2/206 174/138 F |
| 6,261,719 B1 * | 7/2001 | Ikeda | H01M 2/202 429/120 |

(Continued)

FOREIGN PATENT DOCUMENTS

| EP | 0765005 | 3/1997 |
| EP | 0986114 | 3/2000 |

(Continued)

OTHER PUBLICATIONS

Search report from International Search Report in PCT/JP2012/064264, dated is Jul. 10, 2012.

(Continued)

*Primary Examiner* — Michael L Dignan
(74) *Attorney, Agent, or Firm* — Greenblum & Bernstein, P.L.C.

(57) ABSTRACT

A cell wiring module is configured to include a plurality of connection members connecting adjacent electrode terminals of a plurality of single cells having positive and negative electrode terminals. The cell wiring module includes a first unit housing a housed connection member, and a second unit connected to the first unit by a linking connection member different from the housed connection member. Sliding occurs in the connection direction of the connection members between the linking connection member for connection and at least one of the first unit and the second unit.

10 Claims, 11 Drawing Sheets

(56) References Cited

U.S. PATENT DOCUMENTS

| | | | |
|---|---|---|---|
| 7,556,533 B2* | 7/2009 | Seo | H01M 2/0242 |
| | | | 320/116 |
| 8,426,056 B2 | 4/2013 | Ikeda et al. | |
| 2009/0104516 A1* | 4/2009 | Yoshihara | H01M 2/105 |
| | | | 429/149 |
| 2011/0076521 A1* | 3/2011 | Shimizu | H01M 2/1061 |
| | | | 429/7 |
| 2011/0081569 A1 | 4/2011 | Kim | |
| 2011/0104556 A1* | 5/2011 | Kim | H01M 2/1077 |
| | | | 429/160 |

FOREIGN PATENT DOCUMENTS

| | | |
|---|---|---|
| EP | 2685526 | 1/2014 |
| JP | 11-086831 | 3/1999 |
| JP | 2000-149909 | 5/2000 |
| JP | 2002-164034 | 6/2002 |
| JP | 2009-043637 | 2/2009 |
| JP | 2009-252652 | 10/2009 |
| JP | 2011-008955 | 1/2011 |
| JP | 2011-82159 | 4/2011 |

OTHER PUBLICATIONS

Search report from E.P.O., dated Dec. 2, 2014.
U.S. Appl. No. 14/114,807, filed Oct. 30, 2013.

* cited by examiner

CELL WIRING MODULE

CROSS-REFERENCE TO RELATED APPLICATION

This is a continuation application of U.S. patent application Ser. No. 14/114,807, filed Oct. 30, 2013, which is a U.S. National Stage Application of International Application No. PCT/JP2012/064264, filed Jun. 1, 2012. The disclosures of these documents, including the specifications, drawings and claims, are incorporated herein by reference in their entirety. This Application claims priority of Japanese Patent Application No. 2011-149075, filed Jul. 5, 2011. The disclosures of these documents, including the specifications, drawings and claims, are incorporated herein by reference in their entirety.

FIELD OF THE INVENTION

The present invention relates to a cell wiring module.

BACKGROUND OF THE INVENTION

A cell module for an electric vehicle or a hybrid car has a plurality of single cells stacked in rows, the single cells being configured by a main body having a flat shape and a power generating element on an interior thereof and by positive and negative electrode terminals. In addition, the plurality of single cells are connected serially or in parallel by connecting the electrode terminals of adjacent single cells with a connection member (bus bar).

Thus, in a configuration of Patent Literature 1, noted below, a battery connection plate is disclosed which is configured by incorporating a plurality of bus bars by insert molding on a synthetic resin base board, and the battery connection plate is mounted on a plurality of cells, thereby integrally connecting the plurality of bus bars.

In order to prevent failure in mounting the battery connection plate (cell wiring module) due to dimensional errors in spacing between electrodes, the configuration of Patent Literature 1 provides a spacing adjustment means to the base board.

RELATED ART

Patent Literature

Patent Literature 1: Japanese Patent Laid-open Publication No. 2000-149909

SUMMARY OF THE INVENTION

Problems to Be Solved by the Invention

However, an occurrence of dimensional errors in the cell module is not limited to spacing of electrodes connected by the bus bar (connection member). For example, after the cell wiring module is positioned with respect to the main body of the single cell, the cell wiring module is fastened together with a bolt or the like. In such a case, a mounting failure may occur not only due to a dimensional error in spacing between the electrodes, but also due to a dimensional error between the main body of the single cell and the cell wiring module.

The present invention was achieved based on the above-noted circumstances and has as an object to provide a cell wiring module capable of preventing failure when mounting on a plurality of single cells.

Means for Solving the Problems

The present invention is a cell wiring module configured to include a plurality of connection members connecting adjacent electrode terminals of a plurality of single cells having positive and negative electrode terminals. The cell wiring module includes a first unit housing the connection member, and a second unit connected to the first unit by a connection member different from the connection member. Sliding occurs in a connection direction of the connection members between the connection member for connection and at least one of the first unit and the second unit. According to the present configuration, even in a case where a dimensional error occurs between the single cells and the cell wiring module, sliding occurs in the connection direction of the connection members between the connection member for connection and at least one of the first unit and the second unit. Therefore, the dimensional error between the single cells and the cell wiring module can be absorbed by sliding occurring between the connection member and at least one of the first unit and the second unit. Accordingly, failure caused by a dimensional error or the like when mounting the cell wiring module can be prevented.

In addition to the above configuration, having the following configuration is more preferable.

The connection member includes an engaged portion. In addition, at least one of the first unit and the second unit includes an engagement portion capable of engaging with the engaged portion with a predetermined clearance in the connection direction.

For example, after each of the units is fixated to the single cells by a portion other than the connection member, sliding of the connection member becomes possible in the range of the predetermined clearance. Accordingly, even in a case where a dimensional error occurs, the connection member can be displaced in the connection direction in the range of the predetermined clearance, and thus work of assembling the connection member can be facilitated.

The engaged portion is provided at a plurality of locations in the connection direction.

In this way, as compared to a case where the engaged portion is provided in one location, a larger dimensional error can be absorbed and thus failure when mounting the cell wiring module can be further prevented.

One of the first unit and the second unit includes a fitting projection projecting in the connection direction of the connection member. In addition, the other of the first unit and the second unit includes a fitting recess fitting together with the fitting projection.

In this way, the fitting projection and the fitting recess are fitted together, and thus positioning between the units and inhibition of flexure deformation between the units is facilitated.

The connection members for connection between the first unit and the second unit are placed on base plates, and each of the base plates are fitted together.

In this way, positioning between both the units becomes possible.

The first unit and the second unit have identical shapes.

In this way, because the first unit and the second unit can be universalized, a die for molding the first unit and the second unit can be universalized.

The connection members are attached to both the first unit and the second unit in a plurality of rows. Of ends of the first unit on the second unit side, an end corresponding to a first row of the connection members protrudes toward the second unit more than an end corresponding to a second row of the connection members. Of ends of the second unit on the first unit side, an end corresponding to the second row of the connection members protrudes toward the first unit more than an end corresponding to the first row of connection members.

In this way, as compared to a case where the units are separated in a straight line shape in a direction orthogonal to an alignment direction thereof, for example, rigidity of both the units can be increased with respect to a force in a torsion direction.

The first unit and the second unit include positioners for positioning with respect to the single cells.

The first unit and the second unit can be positioned with the positioners. Thus, with this position as a reference, a dimensional error occurring between the single cells and each of the units can be absorbed by sliding between the first unit or the second unit and the connection member. Thus, after the dimensional error is resolved by sliding when positioning, the connection members can be fastened.

The cell wiring module is fixated to the single cells by inserting a pole-shaped terminal or a shaft of a bolt through a through-hole of the connection member. The through-hole has an elliptical shape long in the connection direction of the connection member.

The through-hole of the connection member has the elliptical shape long in the connection direction of the connection member, and thus even when there is a dimensional error due to variation in dimensional accuracy between terminals, the dimensional error can be absorbed and the pole-shaped electrode terminal or the shaft of the bolt can be inserted through the through-hole of the connection member.

The plurality of single cells have a flat shape and are aligned in a long axis direction of a surface having the electrode terminals, and the connection member connects the electrode terminals adjacent to each other in the long axis direction.

Variation in dimensional accuracy is particularly likely to occur with regard to the long axis direction of the single cell due to the length of the axis, and thus a dimensional error between the plurality of single cells and the cell wiring module is likely to increase. However, according to the present configuration, failure caused by a dimensional error can be prevented in such a case where dimensional errors are likely to occur.

The plurality of single cells are aligned in a short axis direction of a surface having the electrode terminals, and the connection member connects the electrode terminals aligned in the short axis direction.

In this way, a degree of freedom of connection of the plurality of single cells can be increased.

Effect of the Invention

According to the present invention, failure when mounting on a plurality of single cells can be prevented.

MODE FOR CARRYING OUT THE INVENTION

Embodiment 1

Figure 1:
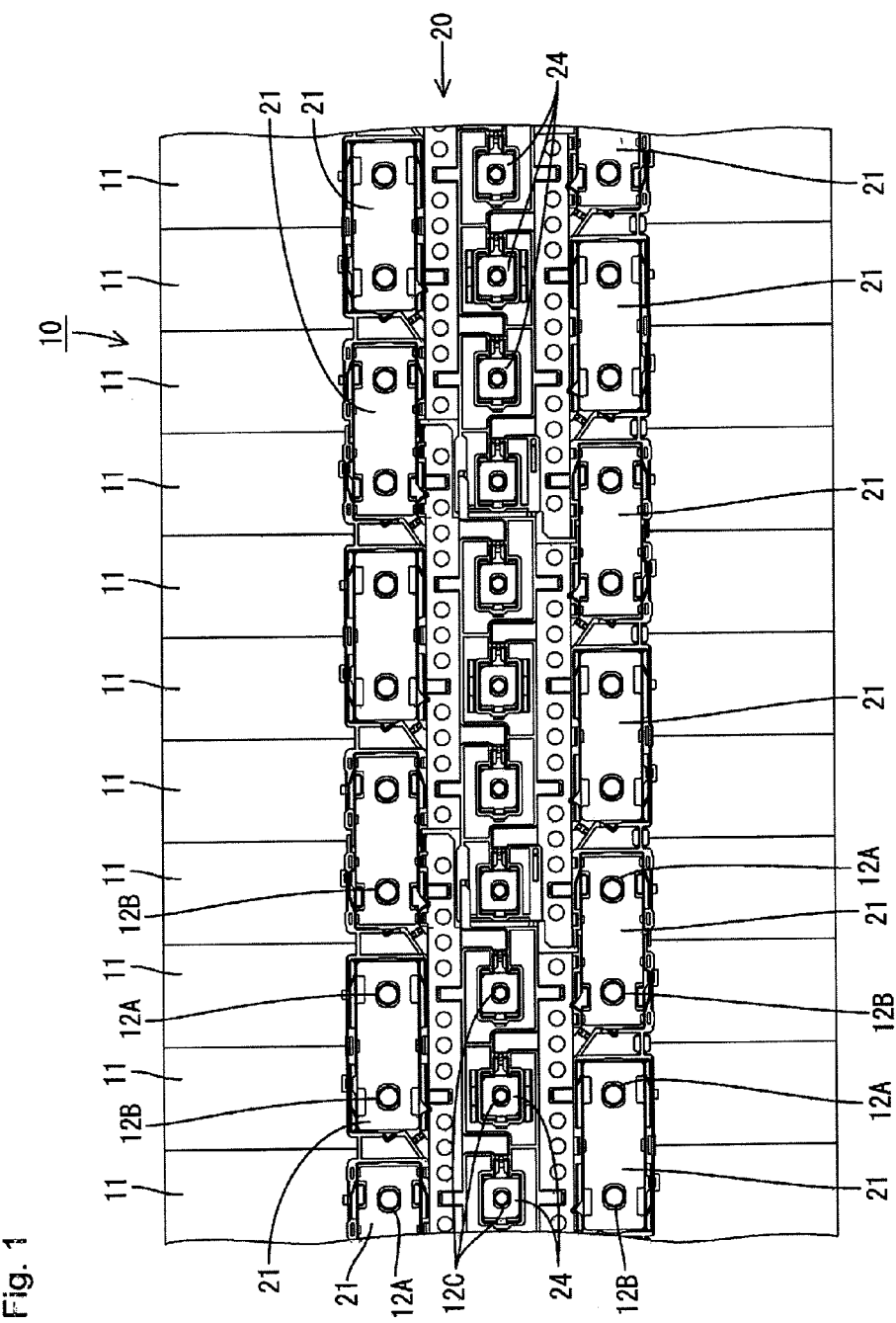
FIG. 1 is a plan view illustrating a cell module according to Embodiment 1.

Hereafter, with reference to FIGS. 1 to 5, a description is given of an embodiment of the present invention. A cell wiring module 20 of the present embodiment connects, with a connection member 21, electrode terminals 12A and 12B of adjacent single cells 11. The cell wiring module 20 is attached to a cell module 10, which is used as a vehicle power source in an electric or hybrid automobile, for example. Hereafter, the description is given with upward in FIG. 1 treated as forward and downward treated as rearward for a front-back direction, while a near face of a sheet of FIG. 1 is treated as upward and a far face of the sheet is treated as downward for a vertical direction.

Cell Module

As shown in FIG. 1, the cell module 10 is configured to include, for example, a plurality (eleven, in FIG. 1) of the single cells 11 (a bank of single cells) and the cell wiring module 20 connecting the plurality of single cells 11.

Single Cell

The single cells 11 include terminals 12A to 12C projecting perpendicularly from a top surface of a flat, rectangular main body, the main body housing a power generating element (not shown in the drawings) on an interior thereof. The terminals 12A to 12C are configured by a front-back pair of electrode terminals 12A and 12B (in the drawings, 12A is a positive electrode and 12B is a negative electrode), and a squared tubular terminal for voltage detection 12C provided at a portion intermediate to the pair of electrode terminals 12A and 12B. The terminal for voltage detection 12C detects a voltage of substantially a center of the electrode terminals 12A and 12B.

Each of the electrode terminals 12A to 12C is a squared tubular nut (square nut) with a circular screw hole running through a center thereof. A shaft of a bolt is threaded with the electrode terminals 12A to 12C to fixate each of the connection members 21 and a voltage detection terminal 24. Each of the single cells 11 is arranged in an orientation such that polarities of adjacent electrode terminals 12A and 12B are opposite. The bank of single cells is fixated by a holding plate not shown in the drawings.

(Cell Wiring Module)

Figure 2:
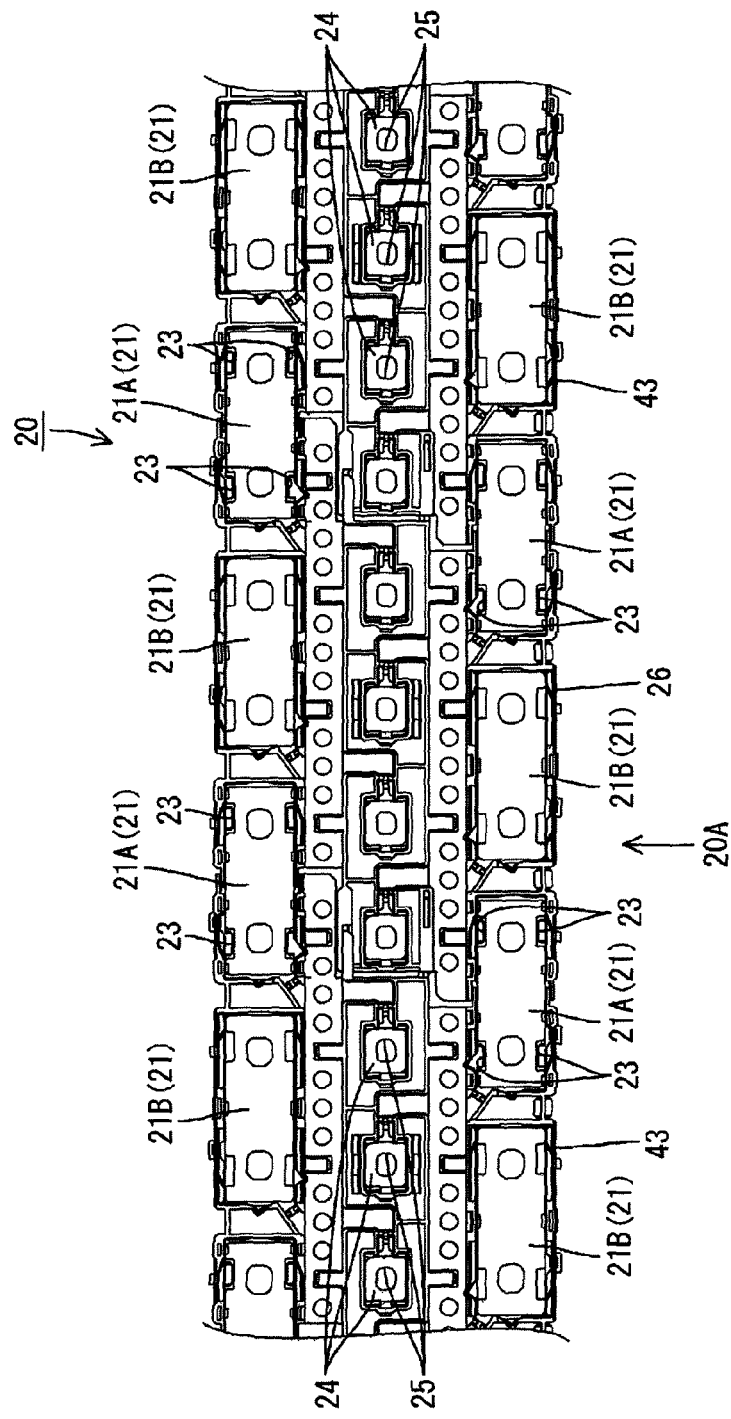
FIG. 2 is a plan view illustrating a cell wiring module.

As shown in FIG. 2, the cell wiring module 20 is configured with a plurality of the connection members 21 connecting the electrode terminals 12A and 12B of the adjacent single cells 11; a plurality of the voltage detection terminals 24 detecting the voltage of the single cells 11; and a linked connection unit 20A made of a synthetic resin and housing the plurality of connection members 21 and the plurality of voltage detection terminals 24.

(Connection Member)

Figure 3:
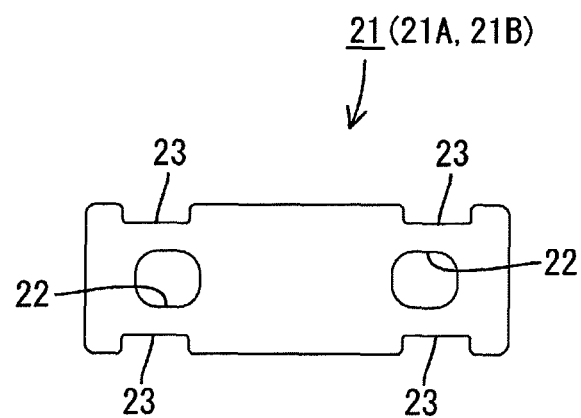
FIG. 3 is a plan view illustrating a connection member.

The connection member 21 is configured with a metal such as copper, a copper alloy, stainless steel (SUS), or aluminum. As shown in FIG. 3, the connection member 21 has a plate shape of a length corresponding to a measurement between the adjacent electrode terminals 12A and 12B. In addition, a pair of through-holes 22 are formed running through the connection member 21, the shaft of the bolt being inserted through the through-holes 22 (communicating with the screw holes of the electrode terminals 12A and 12B). A shape of the through-holes 22 is an elliptical shape long in a left-right direction (a connection direction).

A lateral edge in the connection direction of the connection member 21 has engaged recesses 23 formed at four locations on two sides of the through-holes 22, the engaged recesses 23 being formed by cutting a rectangular shape (step shape) with length in the front-back direction out of the lateral edge (formed by narrowing a width dimension of the connection member 21 in the step shape). Moreover, corners where the engaged recesses 23 constrict in the step shape have a slightly tapered shape.

Herein, as shown in FIG. 2, the connection member 21 is configured with a linking connection member 21A linking a first unit 26 and a second unit 43, and with a housed connection member 21B housed entirely on the first unit 26 and the second unit 43. The connection members 21A and 21B have identical shapes. The engaged recess 23 provided on the linking connection member 21A of the connection members 21 is an example of an "engaged portion" configuring the present invention.

The voltage detection terminal 24 includes a crimped portion where a voltage detection wire (not shown in the drawings) is crimped on a rear side of a rectangular flat plate portion. A circular through-hole 25 is formed in a center portion of the flat plate portion, through which the shaft of the bolt can be inserted. In the crimped portion, an exposed core wire portion on the end of the voltage detection wire is crimped. Moreover, although not shown in the drawings, the voltage detection terminal 24 is positioned so as to line up with one side of each of the connection members 21, in addition to a detection housing. A recess is formed on a periphery of the connection members 21, the voltage detection terminal 24 fitting into the recess.

The voltage detection wire is run through a wire through-trench 41 and connected to a cell ECU not shown in the drawings. A microcomputer, an element, and the like is installed in the cell ECU, which has a known configuration that includes functions for detection of the voltage, current, temperature, and the like of the single cells 11, and for performing control of power storage and release of each of the single cells 11, and the like.

Figure 4:
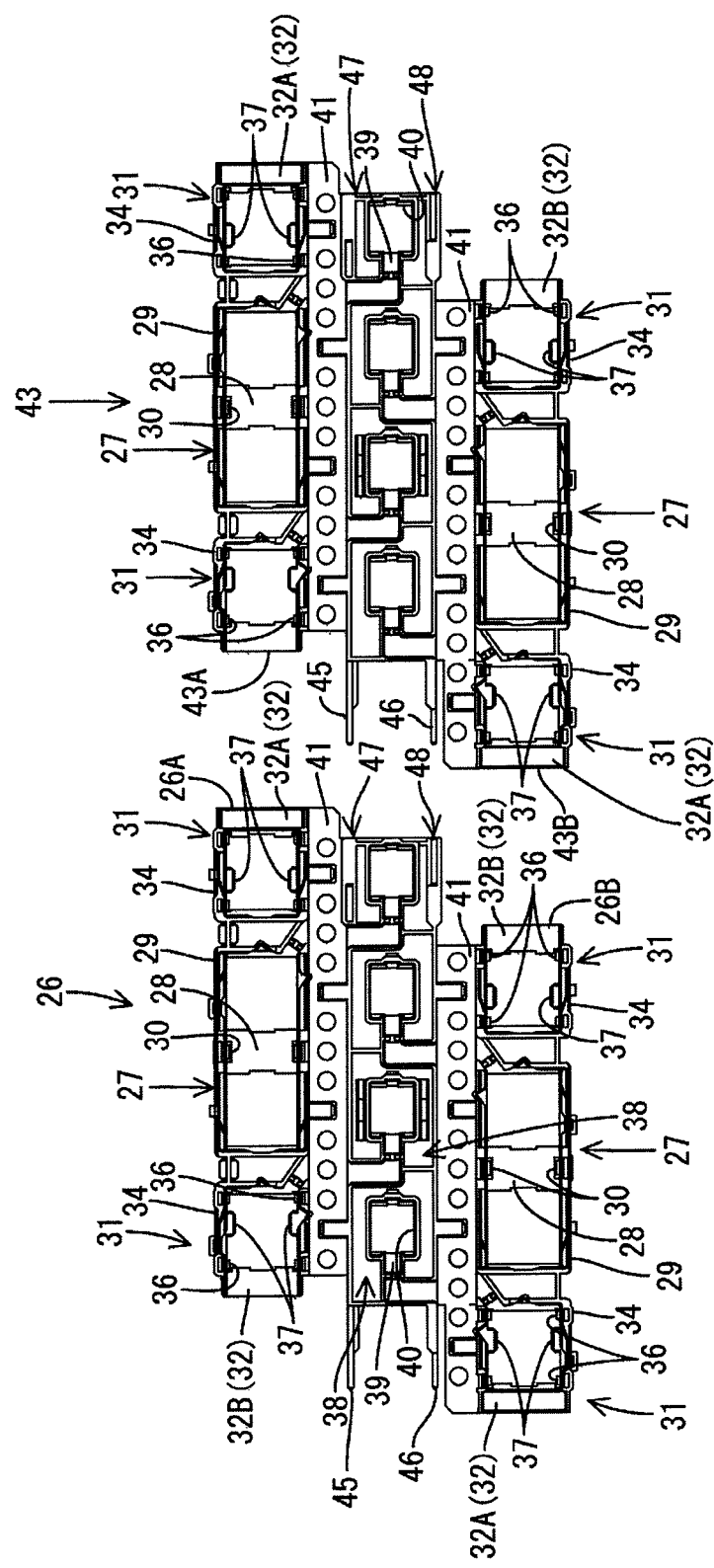
FIG. 4 is a plan view illustrating a first unit and a second unit.

As shown in FIG. 4, the linked connection unit 20A is configured to link, via the connection member 21, the first unit 26 and the second unit 43, the first unit 26 being provided on a first left-right direction side and housing the plurality of connection members 21 and the voltage detection terminals 24, the second unit 43 being provided on a second left-right direction side and housing the plurality of connection members 21 and the voltage detection terminals 24.

(First Unit)

The first unit 26 is made of a synthetic resin. The first unit 26 has a shape in which a front end protrudes in a step shape (crank shape) further to the right than a back end, and in which the back end protrudes in a step shape (crank shape) further to the left than the front end. The first unit 26 includes a housing 27, a holder 31, a detection housing 38, and the wire through-trench 41. The housing 27 is provided to each of a front and back of the first unit 26 and houses the housed connection member 21B. The holder 31 is provided to left and right ends aligned with the housing 27 and holds a first side in a length direction (connection direction) of the linking connection member 21A. The detection housing 38 is provided aligned with a front-back direction center portion and houses the voltage detection terminal 24. The voltage detection wire is passed through the wire through-trench 41.

The housing portion 27 includes a base plate 28 on which the housed connection member 21B is placed, and a dividing wall 29 having a squared tube shape surrounding the housed connection member 21B. The base plate 28 links base ends of opposing dividing walls 29 at a left-right direction center portion of the dividing walls 29.

Rectangular openings are formed to the left and right of the base plate 28. The openings are portions into which the electrode terminals 12A and 12B advance, and are slightly larger than the electrode terminals 12A and 12B.

The dividing wall 29 is set to a height capable of preventing a short circuit caused by a tool or the like contacting the short connection member 21 or a top portion of the bolt. A pair of holding pieces 30 are provided at a left-right direction middle portion of the dividing wall 29, the holding pieces 30 holding the housed connection member 21B within the housing 27. The holding pieces 30 engage the connection member 21 on top of the base plate 28 by positioning a hook-shaped forefront end above front and back edges of the base plate 28.

Each of the holding pieces 30 is formed by cutting a squared "U"-shaped notch from the dividing wall 29. On an exterior side of the holding pieces 30, a support wall is integrally formed with the dividing wall 29, the support wall covering the notched portions. The detection housing 38 includes a recess 39, into which the voltage detection terminal 24 is fitted and through which the voltage detection wire is passed, and a rectangular opening 40, through which the terminal for voltage detection 12C is passed. Moreover, although not shown in the drawings, a positioner projecting in a squared frame shape is provided around the opening 40 on a reverse side of the detection housing 38. A top end portion of the terminal for voltage detection 12C of the single cell 11 is fitted into the positioner, thus positioning the first unit 26 with respect to the single cell 11 (a reference position of the first unit 26 with respect to the single cell 11 is fixed).

Fitting projections 45 and 46 projecting to the left (connection direction) are provided on a left end of the four (plurality of) aligned detection housings 38 (a first end portion in the connection direction of the connection member 21 of the first unit 26 and between the front and back linking connection members 21A). In addition, fitting recesses 47 and 48 fitting together with the fitting projections 45 and 46 are provided on a right end of the four (plurality of) aligned detection housings 38 (a second end portion in the connection direction of the connection member 21 of the first unit 26 and between the front and back linking connection members 21A).

The fitting projections 45 and 46 are both pole-shaped members and have a flat shape that is thick-walled in the vertical direction and thin-walled in the front-back direction. The fitting recesses 47 and 48 are formed with a depth and size capable of fitting together with the fitting projections 45 and 46 by inserting the fitting projections 45 and 46 until forefront ends thereof are halted.

The wire through-trench 41 is provided to front and back of the detection housing 38 so as to lie alongside the detection housings 38, which are aligned left-to-right. When the first unit 26 and the second unit 43 are connected, the wire through-trenches 41 are linked together. The holder 31 is provided to positions in each of four corners of the first unit 26 and includes a base plate 32 on which one end side of the linking connection member 21A is placed, and a dividing wall 34 surrounding the one end side of the linking connection member 21A on three sides.

The base plate 32 is formed on left and right end portions of the first unit 26. A base plate 32A on a first left-right direction end has a shape in which both lateral edges rise up slightly, while a base plate 32B is formed on a second left-right direction end. Also, the base plate 32A of the first unit 26 is fitted together with the base plate 32B of the second unit 43 and the base plate 32B of the first unit 26 is fitted together with the base plate 32A of the second unit 43. Thus, the base plate 32A receives the base plate 32B from below. A forefront end of the base plate 32B is capable of striking a portion formed on the base plate 32A side, the portion having a diameter constricted in a step shape. A portion with no base plate 32 forms a rectangular opening into which the cylindrical electrode terminals 12A and 12B can advance.

The dividing wall 34 is set to a height capable of preventing a short circuit caused by a tool or the like contacting the connection member 21, the bolt, or the like. The dividing wall 34 is configured with a pair of opposing walls opposing on front and back, and a side wall connecting the pair of opposing walls. A side opposite the side wall is left open. A holding piece 36 is formed on each of the opposing walls for holding the linking connection member 21A within the holders 31 (on the base plate 28 side).

The dividing wall 34 includes the squared "U"-shaped notch, thereby forming the holding piece 36 on an inner side of the notch. The holding piece 36 has a shape in which a projection dimension increases in a sloped shape (hook shape) toward the base plate 32 and, by positioning the forefront end side of the hook of the holding piece 36 above an edge portion of the linking connection member 21A, the linking connection member 21A is engaged between the bottom end of the holding piece 30 and the base plate 28.

An engagement force of the linking connection member 21A from the holding piece 36 is sufficient to allow sliding (sliding displacement) of the linking connection member 21A in the connection direction. The linking connection member 21A may also be rendered slidable in resistance to a force of the holding piece 36 pressing against the linking connection member 21A, or rendered slidable by having a slight gap formed between the holding piece 36 and the linking connection member 21A (without generating the press-down force). Moreover, a support wall covering the notched portions is integrally formed with the dividing wall 34 on the exterior side of each of the holding pieces 36.

An engagement projection 37 (an example of an "engagement portion" configuring the present invention) is provided on an interior side of the dividing walls 34 (opposing walls), the engagement projection 37 allowing left-right direction displacement of the linking connection member 21A within a predetermined range (engaging at or above the predetermined range) by engaging with the engaged recess 23 of the linking connection member 21A.

The engagement projection 37 projects toward an interior in a rectangular shape (a step shape) on a base end portion of each of the opposing walls in a position corresponding to the engaged recess 23 of the linking connection member 21A, i.e., in a position where the opening is formed through which the electrode terminals 12A and 12B are inserted. The projection dimension of the engagement projection 37 is slightly smaller than a notched depth dimension of the engaged recess 23 in a lateral surface of the connection member 21. The vertical-direction position of the engagement projection 37 is the same as that of the engaged recess 23 of the connection member 21. Corners of the engagement projection 37 have a tapered shape.

Herein, a length of the engagement projection 37 in the left-right direction (connection direction of the connection member 21) is smaller than a length of the engaged recess 23 in the left-right direction. Specifically, a dimension of the engaged recess 23 is a dimension in which predetermined clearances CL1 and CL2 have been added to a front and back of the engagement projection 37.

Figure 5:
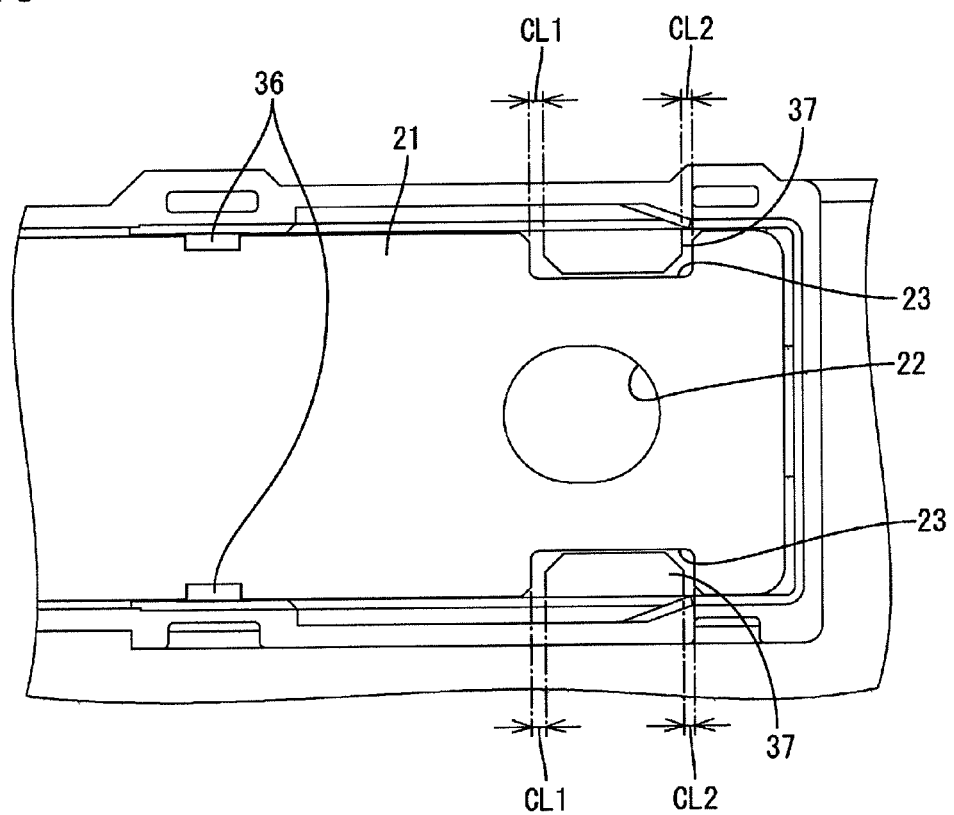
FIG. 5 is an explanatory diagram of a clearance created between an engaged recess and an engagement projection.

The second unit 43 has a shape identical to that of the first unit 26 and thus, as shown in FIG. 4, identical reference numerals to those of the first unit 26 are given to the second unit 43 and descriptions thereof are omitted. In this way, by engaging the engaged recess 23 and the engagement projection 37, as shown in FIG. 5, the linking connection member 21A becomes slidable (slide displaceable) with respect to the second unit 43 in the left-right direction in a range of the predetermined clearances CL1 and CL2 (CL1+CL2). In addition, the linking connection member 21A also becomes slidable (slide displaceable) with respect to the first unit 26 in the left-right direction in the range of the predetermined clearances CL1 and CL2 (CL1+CL2). Thereby, because the linking connection member 21A becomes slidable (slide displaceable) only by the clearance CL determined by a multiple of a number N of combined engaged recesses 23 and engagement projections 37 in the left-right direction (N=2 in the present embodiment), dimensional error when attaching the first unit 26 or the second unit 43 to the plurality of single cells 11 can be absorbed by sliding.

In addition, as shown in FIG. 4, the connection-direction ends of both units 26 and 43 are step-shaped (crank-shaped). An end 26A corresponding to a row of forward (first side) connection members 21 in the first unit 26 projects toward the second unit 43 more than an end 26B corresponding to a row of rearward (second side) connection members 21. In addition, an end 43B corresponding to a row of rearward (second side) connection members 21 in the second unit 43 projects toward the first unit 26 more than an end 43A corresponding to a row of forward (first side) connection members 21. Thereby, projections and recesses on boundary portions of both the units 26 and 43 have shapes mutually fitting together.

Next, a description is given of attachment of the cell wiring module 20. First, the cell wiring module 20 is formed in which the housed connection members 21B are housed in each of the housings 27 with respect to the first unit 26 and the second unit 43, the linking connection members 21A are held by each of the holders 31, and the voltage detection terminals 24 are mounted, the voltage detection wire being crimped in the voltage detection terminal 24 (see FIG. 2).

Next, the cell wiring module 20 is mounted such that the positioners provided to the reverse side of each of the units 26 and 43 are positioned by each of the terminals for voltage detection 12C of the plurality of single cells 11 positions. At this point, even when an error occurs in the space between the terminals for voltage detection 12C serving as references for positioning due to variation in dimensional accuracy of the single cells 11, the first unit 26 and the second unit 43 can be slid left and right relative to each other by an amount corresponding to the clearance generated by the engagement projection 37 and the engaged recess 23.

Then, after the first unit 26 and the second unit 43 are positioned at a reference position, the shaft of the bolt is passed through the through-holes 22 of each of the connection members 21 and the connection members 21 are bolt-fastened between the electrode terminals 12A and 12B. At this time, because the through-holes 22 have elliptical shapes long in the left-right direction, errors in the dimensional accuracy between the electrode terminals 12A and 12B can be absorbed by the elliptical through-holes 22 and the bolt-fastening can be performed more securely.

The following positive effects are achieved with the present embodiment.

(1) According to the present embodiment, the cell wiring module 20 is configured to include a plurality of the connection members 21 connecting the adjacent electrode terminals of a plurality of the single cells 11 having positive and negative electrode terminals. The cell wiring module 20 includes the first unit 26 and the second unit 43, the first unit 26 housing the housed connection member 21B (connection member), and the second unit 43 being connected to the first unit 26 by the linking connection member 21A (different connection member) different from the housed connection member 21B (connection member). Sliding occurs in the connection direction of the connection members 21 between the linking connection member 21A (connection member) for connection and at least one of the first unit 26 and the second unit 43.

According to the present embodiment, even in a case where a dimensional error occurs between the single cells 11 and the cell wiring module 20, sliding occurs in the connection direction of the connection members 21 between the linking connection member 21A (connection member) for connection and (at least one of) the first unit 26 and the second unit 43. Therefore, the dimensional error between the single cells 11 and the cell wiring module can be absorbed by sliding occurring between the linking connection member 21A and at least one of the first unit 26 and the second unit 43. Accordingly, failure caused by a dimensional error or the like when mounting the cell wiring module 20 can be prevented.

(2) The connection member 21 includes the engaged recess 23 (engaged portion). In addition, at least one of the first unit 26 and the second unit 43 includes the engagement projection 37 (engagement portion) capable of engaging with the engaged recess 23 (engaged portion) with a predetermined clearance in the connection direction.

For example, after each of the units is fixated to the single cells 11 by a portion other than the connection member 21, sliding of the connection member becomes possible in the range of the predetermined clearance. Accordingly, even in a case where a dimensional error occurs, the connection member 21 can be displaced in the connection direction in the range of the predetermined clearance, and thus work of assembling the connection members 21 can be facilitated.

(3) The engaged recess 23 (engaged portion) is provided at a plurality of locations in the connection direction. Therefore, as compared to a case where the engaged recess 23 (engaged portion) is provided in one location, a larger dimensional error can be absorbed and failure when mounting the cell wiring module 20 can be further prevented.

(4) One of the first unit 26 and the second unit 43 includes the fitting projections 45 and 46 projecting in the connection direction of the connection members 21. In addition, the other of the first unit 26 and the second unit 43 includes the fitting recesses 47 and 48 fitting together with the fitting projections 45 and 46. In this way, the fitting projections 45 and 46 and the fitting recesses 47 and 48 are fitted together, and thus positioning between the units 26 and 43 and inhibition of flexure deformation between the units 26 and 43 is facilitated.

(5) Each of the base plates 32A and 32B are fitted together, the connection members 21 for connection between the first unit 26 and the second unit 43 being placed on the base plates 32A and 32B. In this way, positioning between both the units 26 and 43 becomes possible.

(6) The first unit 26 and the second unit 43 have identical shapes. Therefore, the first unit 26 and the second unit 43 can be universalized and the die for molding the first unit 26 and the second unit 43 can be universalized.

(7) The connection members 21 are attached to both the first unit 26 and the second unit 43 arranged in a plurality of rows. Of the ends of the first unit 26 on the second unit 43 side, the end 26A corresponding to a first row of the connection members 21 protrudes toward the second unit 43 more than the end 26B corresponding to a second row of the connection members 21. Of the ends of the second unit 43 on the first unit 26 side, the end 43B corresponding to the second row of the connection members 21 protrudes toward the first unit 26 more than the end 43A corresponding to the first row of connection members 21. In this way, as compared to a case where the units 26 and 43 are separated in a straight line shape in a direction orthogonal to the alignment direction thereof, for example, rigidity of both the units 26 and 43 can be increased with respect to a force in a torsion direction.

(8) The first unit 26 and the second unit 43 include the positioners for positioning with respect to the single cells 11. The first unit 26 and the second unit 43 can be positioned with the positioners. Accordingly, after a dimensional error is resolved by sliding during positioning, the connection members can be fastened.

(9) The cell wiring module 20 is fixated to the single cells 11 by inserting the shaft of the bolt through the through-hole 22 (through-hole) of the connection member 21. The through-hole 22 (through-hole) has an elliptical shape long in the connection direction of the connection member 21. The through-hole 22 (through-hole) of the connection member 21 has the elliptical shape long in the connection direction of the connection member 21, and thus even when there is a dimensional error due to variation in the dimensional accuracy between terminals, the dimensional error can be absorbed and the shaft of the bolt can be inserted through the through-hole of the connection member 21.

Embodiment 2

Figure 6:
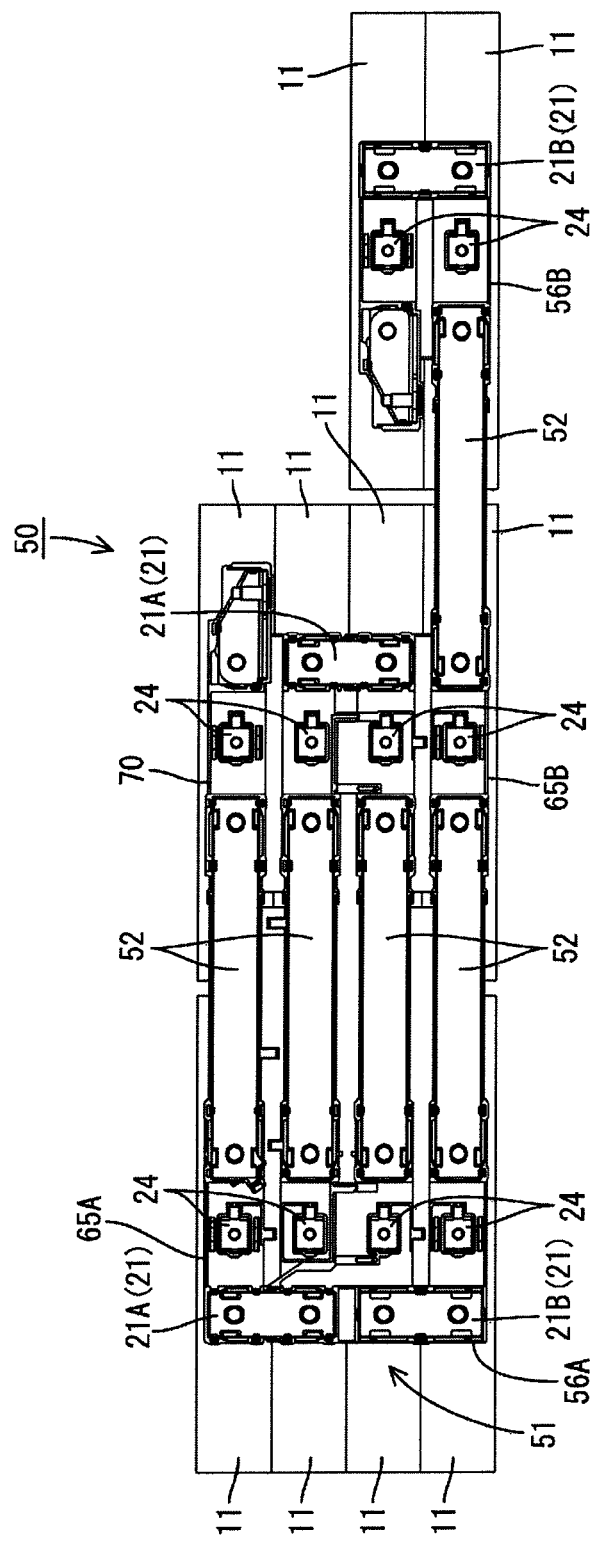
FIG. 6 is a plan view illustrating a cell module according to Embodiment 2.
Figure 7:
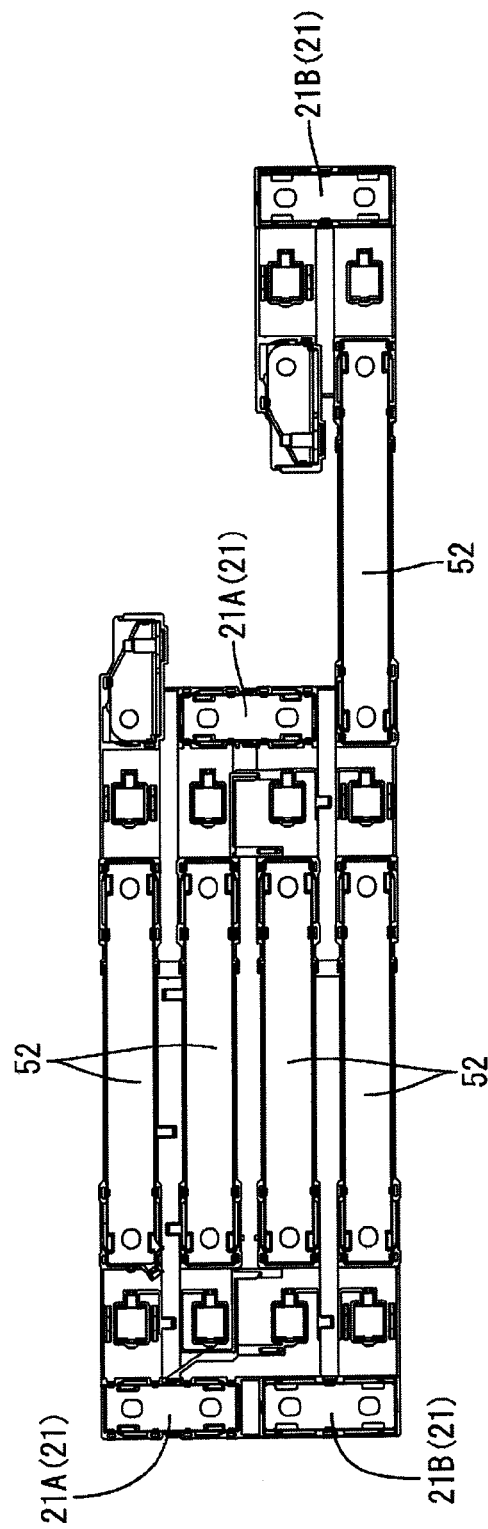
FIG. 7 is a plan view illustrating a cell wiring module.

Embodiment 2 is described with reference to FIGS. 6 to 11. Hereafter, the description is given with upward in FIG. 6 treated as forward and downward treated as rearward for the front-back direction, while a near face of a sheet of FIG. 6 is treated as upward and a far face of the sheet is treated as downward for the vertical direction. Moreover, configurations identical to those of Embodiment 1 are given identical reference numerals and descriptions thereof are omitted.

(Cell Module)

As shown in FIG. 6, a cell module 50 is configured to include, for example, ten (a plurality) of the single cells 11 and a cell wiring module 51 connecting the ten single cells 11. The ten single cells 11 are divided into three rows in a long axis (long side) direction of the top surface of the single cells 11 (a surface having the electrode terminals). Two rows on a left side are stacked in four layers in a short axis direction of the top surface of the single cells 11, and one row on a right end is stacked in two layers in the short axis (short side) direction.

(Cell Wiring Module)

The cell wiring module 51 is configured to include a plurality of the connection members 21 (short connection members) connecting the electrode terminals 12A and 12B on the top surfaces of different single cells 11 adjacent in the short axis direction; a plurality of the long connection members 52 connecting the electrode terminals 12A and 12B of different single cells 11 adjacent in the long axis direction; the voltage detection terminal 24 connected to the voltage detection wire; two (a plurality of) first units 56A and 56B housing the connection members 21 and holding the long connection member 52; three (a plurality of) second units 65A and 65B coupled to the first unit via the connection members 21 and 52; and a connection unit 70 connected to the second units 65A and 65B.

(Long Connection Member)

Figure 8:
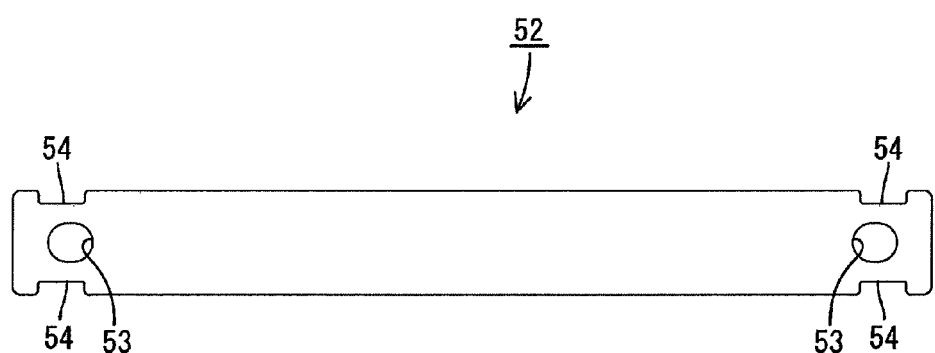
FIG. 8 is a plan view illustrating a long connection member.

The long connection member 52 is configured by a metal such as copper, a copper alloy, stainless steel (SUS), or aluminum. As shown in FIG. 8, the long connection member 52 has a plate shape of a length (elongation) corresponding to a measurement between the connected electrode terminals 12A and 12B. In addition, a pair of through-holes 53 are formed running through the long connection member 52 at left and right ends thereof, the shaft of the bolt being inserted through the through-holes 53 (communicating with the screw holes of the electrode terminals 12A and 12B). A shape of the through-holes 53 is an elliptical shape long in the left-right direction (the connection direction).

Engaged recesses 54 (an example of an "engaged portion" configuring the present invention) are formed on lateral edges on two sides of the through-holes 53 of the long connection member 52, the engaged recesses 54 being formed by cutting a rectangular shape (step shape) with length in the left-right direction out of the lateral edge (formed by narrowing a width dimension of the long connection member 52 in the step shape). Corners where the engaged recess 54 constricts in the step shape have a slightly tapered shape.

(First Unit)

Figure 9:
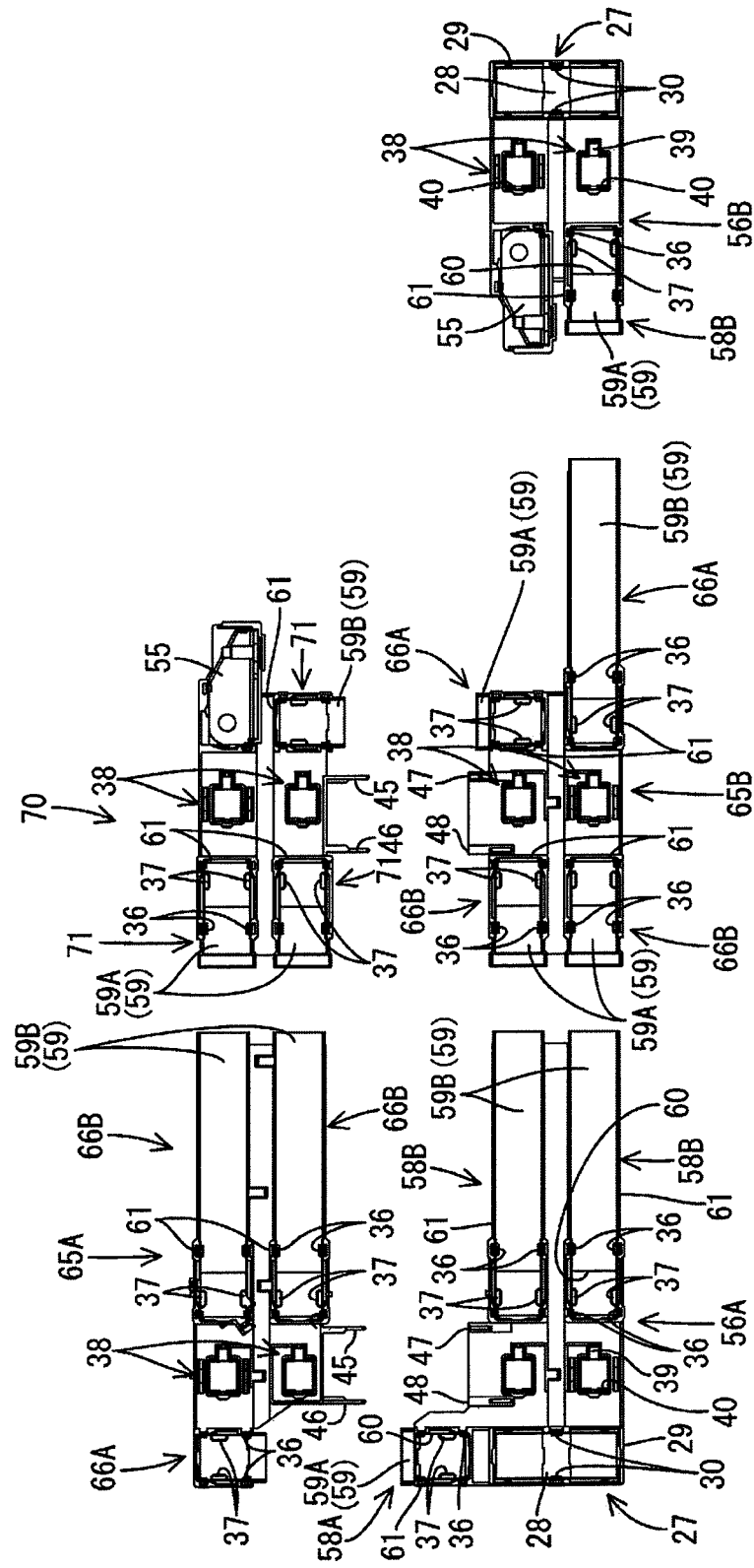
FIG. 9 is a plan view illustrating a first unit, a second unit, and a connection unit.

The first units 56A and 56B are made of a synthetic resin and, as shown in FIG. 9, are located on two sides of the second unit 65B. Both the first units 56A and 56B include the housing 27 housing the connection members 21; the detection housing 38 housing the voltage detection terminal 24; first holders 58A and 58B holding one side in the connection direction of the connection members 21 and 52; and a first positioner 63 (FIG. 11) provided to the reverse face of the detection housing 38 and having the terminal for voltage detection 12C fitted and positioned therein.

The housing 27 houses the entire connection member 21 within a single unit and, as shown in FIG. 9, includes the base plate 28 on which the connection member 21 is placed, the dividing wall 29 having a squared tubular shape surrounding the connection member 21, and the pair of holding pieces 30 engaging the connection member 21 within the housing 27. The detection housing 38 includes the recess 39, into which the voltage detection terminal 24 is fitted and through which the voltage detection wire is passed, and the rectangular opening 40 through which the terminal for voltage detection 12C is passed. The voltage detection wire is led through one of the left and right grooves of the detection housing 38 toward the cell ECU.

The first holders 58A and 58B are positioned such that the first holder 58A is provided so as to be capable of holding the connection member 21, the first holder 58B is provided so as to be capable of holding the long connection member 52, and the mounted connection members 21 and 52 are in a mutually orthogonal relationship.

The first holders 58A and 58B both include a base plate 59 on which the connection members 21 and 52 are placed; a dividing wall 61 provided to a peripheral edge of the base plate 59 enclosing three sides and open on one side; a plurality of the holding pieces 36 projecting toward the inner surface of the dividing wall 61 and engaging on an upper surface side of the lateral edge of the connection members 21 and 52; and the engagement projection 37 allowing displacement (positioning drift) in the connection direction of the connection members 21 and 52 within a predetermined range (range of clearance) by engaging with the engaged recesses 23 and 54 of the connection members 21 and 52. A portion within the dividing walls 61 lacking the base plate 59 is an opening into which the top end portion of the electrode terminals 12A and 12B can advance.

The dividing wall 61 is formed to a height capable of preventing a short circuit caused by a tool or the like contacting the electrode terminals 12A and 12B and the connection member 21. The dividing wall 61 is configured with a front-back pair of opposing walls and a side wall connecting the pair of opposing walls. A side opposite the side wall is left open. A plurality of the holding pieces 36 are provided to the opposing walls and a front-back pair of the holding pieces 36 project inward from a base end of each of the opposing walls. An engagement strength of each of the holding pieces 36 with respect to the connection members 21 and 52 (a strength of an engagement force determined chiefly by a dimension to the base plate 59) is set to a degree such that the connection members 21 and 52 do not escape from between the base plate 59 and the holding pieces 36 and such that the connection members 21 and 52 are capable of sliding in the connection direction.

The engagement projection 37 is formed in a position corresponding to the engaged recesses 23 and 54 of the connection members 21 and 52. The projection dimension of the engagement projection 37 is slightly smaller than the notched depth dimension of the engaged recesses 23 and 54 in the lateral surface of the connection members 21 and 52. A vertical-direction position of the engagement projection 37 is the same as that of the connection members 21 and 52. Moreover, corners of the engagement projection 37 have a tapered shape.

Figure 10:
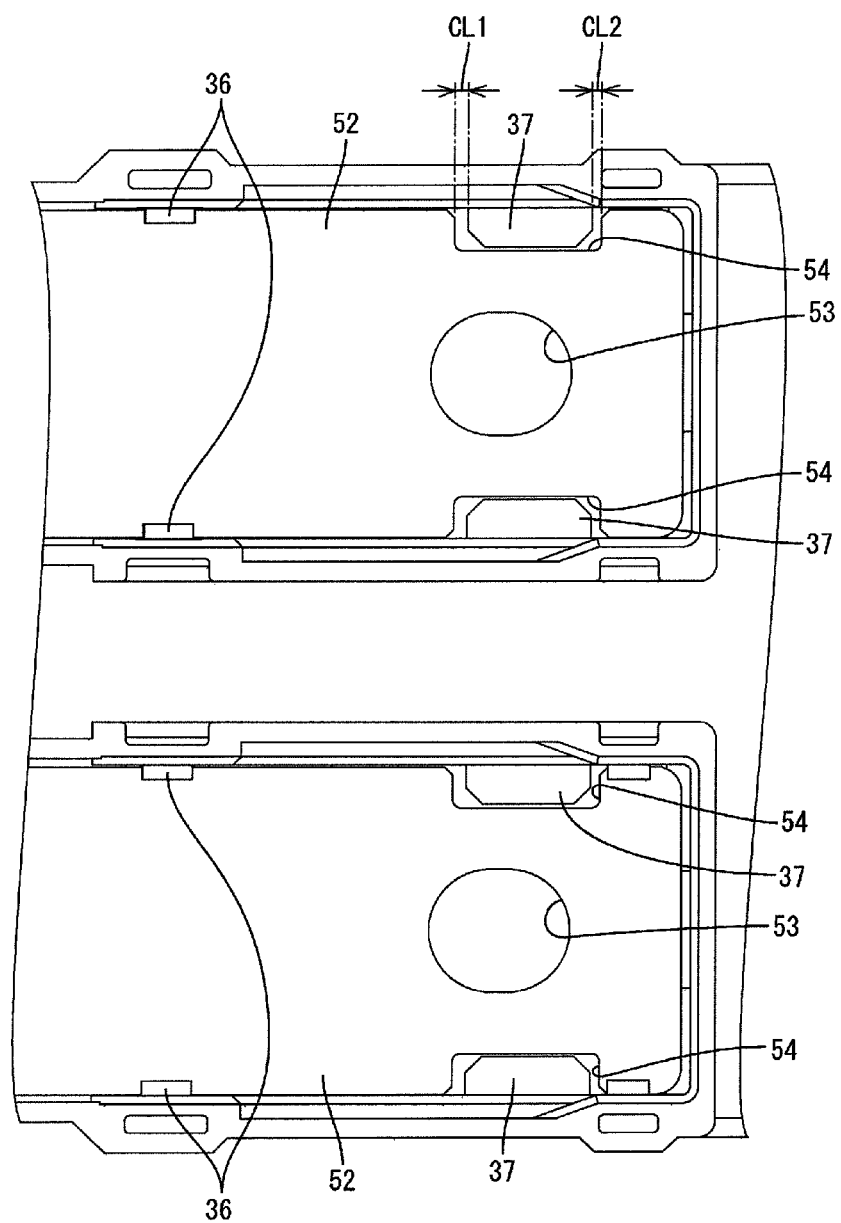
FIG. 10 is an explanatory diagram illustrating a clearance created between an engaged recess and an engagement projection.

Herein, the length of each of the engagement projections 37 in the connection direction of the connection members 21 and 52 is slightly shorter than the length of the engaged recess 54 in the connection direction of the connection members 21 and 52. Specifically, as shown in FIG. 10, connection-direction ends of the engaged recess 54 have the clearances CL1 and CL2 (gaps) with the connection-direction ends of the engagement projection 37.

Thereby, the connection members 21 and 52 are capable of sliding (capable of slide-displacing) in the front-back direction with respect to the first units 56A and 56B in the range of the predetermined clearances CL1 and CL2 (CL1+CL2). In addition, as shown in FIG. 9, an end portion connection member 55 is mounted on the first unit 56B and the connection unit 70, the end portion connection member 55 being connected to the electrode terminals 12A and 12B at an end of the connection (serial connection) of the single cells 11. A through-hole through which the shaft of the bolt is inserted is formed on the end portion connection member 55. In addition, an external connection terminal for connecting to a terminal of a wire linked to an external inverter or the like is provided projecting on the end portion connection member 55.

Figure 11:
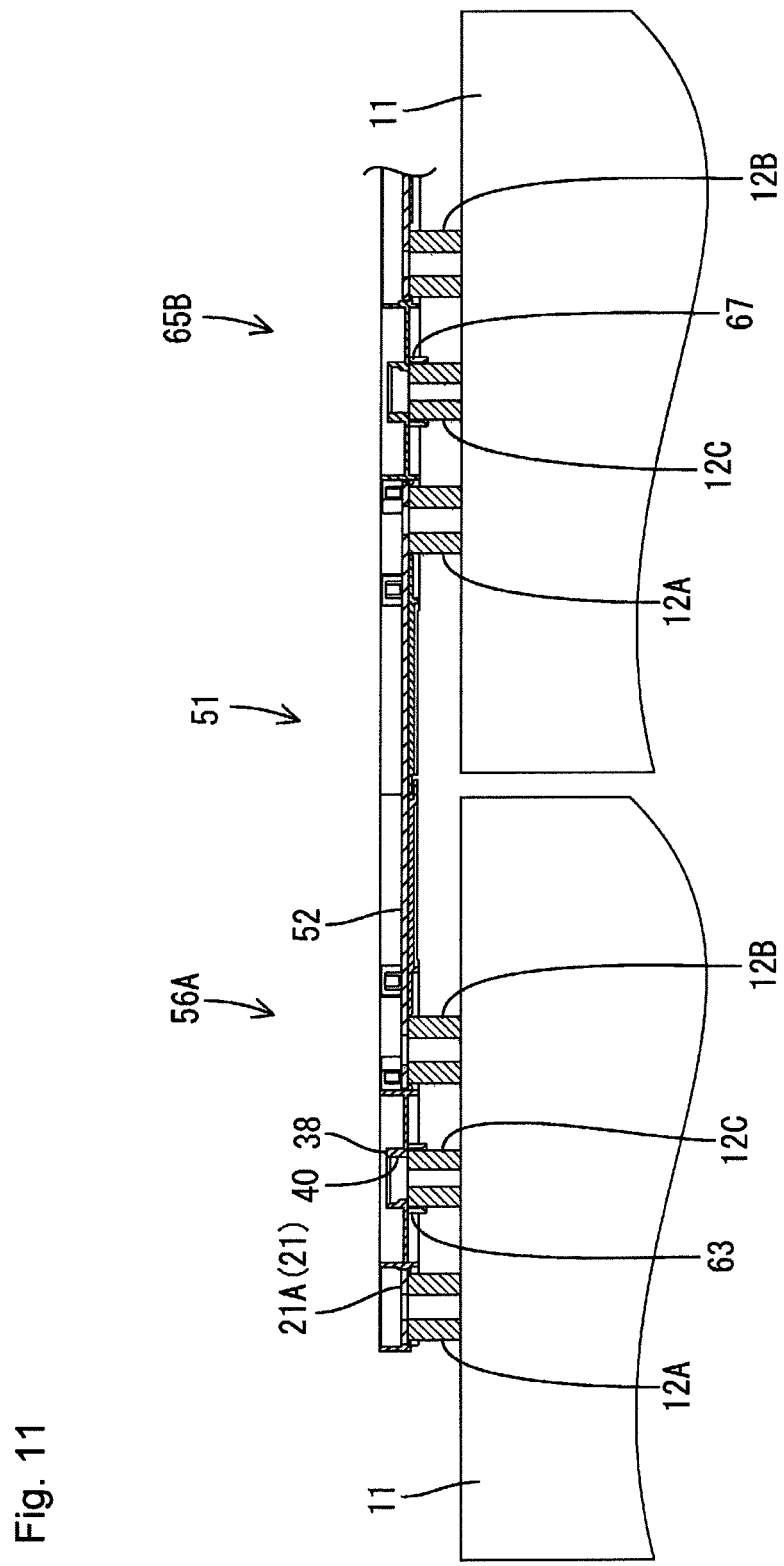
FIG. 11 is a cross-sectional view illustrating a state in which the cell wiring module is attached to a plurality of single cells.

As shown in FIG. 11, the first positioner 63 is provided to the reverse face of the detection housing 38 so as to project in a squared frame shape (squared tube shape) encircling the opening 40. The first positioner 63 is positioned in a position of the terminal for voltage detection 12C by the squared tubular (rectangular) top end portion of the terminal for voltage detection 12C being accommodated (fitted) on an interior thereof with substantially no gaps.

(Second Unit)

The second units 65A and 65B are made of a synthetic resin and, as shown in FIG. 9, are provided at positions adjacent to the first units 56A and 56B. The second units 65A and 65B include the detection housing 38 housing the voltage detection terminal 24; a plurality of second holders 66A and 66B holding one side in the connection direction of the connection members 21 and 52; and a second positioner 67 (FIG. 11) provided to the reverse face of the detection housing 38 and having the terminal for voltage detection 12C fitted and positioned therein.

The second holders 66A and 66B are provided capable of holding one end side of the connection member 21 and of the long connection member 52. The second holders 66A and 66B include the base plate 59 on which the connection members 21 and 52 are placed; the dividing wall 61 provided to the peripheral edge of the base plate 59 enclosing three sides and open on one side; a plurality of the holding pieces 36 projecting toward the inner surface of the dividing wall 61 and engaging on the upper surface side of the lateral edge of the connection members 21 and 52; and the engagement projection 37 allowing displacement (positioning drift) in the connection direction of the connection members 21 and 52 within a predetermined range by engaging with the engaged recesses 23 and 54 of the connection members 21 and 52. A portion where the base plate 59 is not provided is an opening into which the top end portion of the electrode terminals 12A and 12B can advance.

The dividing wall 61 is formed to a height capable of preventing a short circuit caused by a tool or the like contacting the electrode terminals 12A and 12B and the connection member 21. The dividing wall 61 is configured with the front-back pair of opposing walls and the side wall connecting the pair of opposing walls. The side opposite the side wall is left open.

A plurality of the holding pieces 36 are provided to the opposing walls and a front-back pair of the holding pieces 36 project inward from the base end of each of the opposing walls. The engagement strength of each of the holding pieces 36 with respect to the connection members 21 and 52 (the strength of the engagement force determined chiefly by a dimension to the base plate 28) is set to a degree such that the long connection member 52 does not escape from between the base plate 28 and the holding pieces 36 and such that the connection members 21 and 52 are capable of sliding forward and backward.

The engagement projection 37 is formed in a position corresponding to the engaged recess 54 of the long connection member 52. The projection dimension of the engagement projection 37 is slightly smaller than the notched depth dimension of the engaged recess 54 in the lateral surface of the connection members 21 and 52. The vertical-direction position of the engagement projection 37 is the same as that of the connection members 21 and 52. Moreover, corners of the engagement projection 37 have a tapered shape.

Herein, the length of each of the engagement projections 37 in the connection direction of the connection members 21 and 52 is slightly smaller than the length of the engaged recess 54 in the connection direction of the connection members 21 and 52. Specifically, as shown in FIG. 10, the engaged recess 54 is a dimension in which the predetermined clearances CL1 and CL2 (gaps) have been added to the front and back of the engagement projection 37. Thus, the connection members 21 and 52 are able to slide (able to slide-displace) in the front-back direction with respect to the first units 56A and 56B in the range of the predetermined clearances CL1 and CL2 (CL1+CL2).

As shown in FIG. 11, the second positioner 67 is provided to the reverse face of the detection housing 38 so as to project in a frame shape encircling an opening. The second positioner 67 is positioned in a position of the terminal for voltage detection 12C by the squared tubular (rectangular) top end portion of the terminal for voltage detection 12C being accommodated (fitted) on an interior thereof with substantially no gaps.

As shown in FIG. 9, the connection unit 70 includes the detection housing 38 housing the voltage detection terminal 24; a holder 71 holding one side in the connection direction of the connection members 21 and 52; and a positioner (not shown in the drawings) provided to the reverse face of the detection housing 38 and having the terminal for voltage detection 12C fitted and positioned therein.

The holder 71 is provided in a plurality of locations so as to be capable of holding the connection members 21 and 52. The holder 71 includes the base plate 59 on which the connection members 21 and 52 are placed; the dividing wall 61 provided to the peripheral edge of the base plate 59 enclosing three sides and open on one side; a plurality of the holding pieces 36 projecting toward the inner surface of the dividing wall 61 and engaging on the upper surface side of the lateral edge of the connection members 21 and 52; and the engagement projection 37 allowing displacement (positioning drift) in the connection direction of the connection members 21 and 52 within a predetermined range by engaging with the engaged recesses 23 and 54 of the connection members 21 and 52.

Herein, a rear end portion of the second unit 65A and the connection unit 70 (an end on a side where the plurality of aligned detection housings 38 are connected) includes the fitting projections 45 and 46, which project rearward (in the connection direction of the connection member 21). In addition, a front end portion of the first unit 56A and the second unit 65B (an end on a side where the plurality of aligned detection housings 38 are connected) includes the fitting recesses 47 and 48, which fit together with the fitting projections 45 and 46.

The fitting projections 45 and 46 are both pole-shaped members and have a flat shape that is thick-walled in the vertical direction and thin-walled in the left-right direction. The fitting recesses 47 and 48 are formed with a depth and size capable of fitting together with the fitting projections 45 and 46 by inserting the fitting projections 45 and 46 until forefront ends thereof are halted. Moreover, for the first units 56A and 56B, the two second units 65A and 65B, and the connection unit 70, the base plate 59 on which the connection members 21 and 52 (used in connection) are placed is configured with a base plate 59A and a base plate 59B. Both lateral edges of the base plate 59A rise up slightly and end portions in the connection direction expand in a step shape. The base plate 59B is fitted into an interior of the base plate 59A. The base plate 59A receives the base plate 59B from below. Also, a forefront end of the base plate 59B is capable of striking the step portion of the base plate 59A.

Next, a description is given of attachment of the cell wiring module 51. The two first units 56A and 56B, the two second units 65A and 65B, and the connection unit 70 are positioned as shown in FIG. 9, then the cell wiring module 51 is formed in which the connection members 21 and 52 corresponding to each of the housings 27 and to each of the holders 58A, 58B, 66A, 66B, and 71 are mounted thereon (FIG. 7) and, in addition, the voltage detection terminals 24 are mounted thereon, the voltage detection terminal 24 having the voltage detection wire crimped thereto.

Next, the cell wiring module 51 is integrally mounted to the plurality of single cells 11 such that each of the positioners 63 and 67 of each of the units 56A, 56B, 65A, 65B, and 70 are positioned on each of the terminals for voltage detection 12C of the plurality of single cells 11. At this point, even when an error occurs in the space between the terminals for voltage detection 12C serving as the reference for positioning due to variation in dimensional accuracy of the single cells 11, each of the units 56A, 56B, 65A, 65B, and 70 can be slid up and down or left and right relative to each other by an amount corresponding to the clearances CL1 and CL2 of the engagement projections 37 and the engaged recesses 23 and 54.

Then, the shaft of the bolt is passed through the through-holes 22 and 53 of the connection members 21 and 52, respectively, and the bolt is fastened. At this point, even when the positions of the through-holes 22 and the electrode terminals 12A and 12B are offset, the through-holes 22 and 53 have an elliptical shape long in the connection direction, and thus are able to absorb dimensional errors.

In this way, according to Embodiment 2, the plurality of single cells 11 have a flat shape and are aligned in the long axis direction of a surface having the electrode terminals 12A and 12B, and the connection member 21 connects the electrode terminals 12A and 12B adjacent in the long axis direction.

Variation in dimensional accuracy is particularly likely to occur with regard to the long axis direction of the single cell 11 due to the length of the axis, and thus a dimensional error between the plurality of single cells 11 and the cell wiring module 20 is likely to increase. However, according to the configuration of Embodiment 2, failure caused by a dimensional error can be prevented in such a case where dimensional errors are likely to occur. In addition, the plurality of single cells 11 are also aligned in the short axis direction of the surface having the electrode terminals 12A and 12B, and the connection member 21 connects the electrode terminals 12A and 12B aligned in the short axis direction. Therefore, a degree of freedom of connection of the plurality of single cells 11 can be increased.

Other Embodiments

The present invention is not limited to the embodiments according to the above description and the drawings; rather, a technical scope of the present invention also includes, for example, the following embodiments.

(1) In the above-described embodiments, the engaged recesses 23 and 54 and the engagement projection 37 were provided to both the first units 56A and 56B as well as to the second units 65A and 65B. However, an embodiment is not limited to this. The engaged recesses 23 and 54 and the engagement projection 37 may also be provided to any one of the first units 56A and 56B and the second units 65A and 65B. In this way, failure when mounting the cell wiring module 20 can be prevented by the clearances CL1 and CL2 of the engagement projections 37 and the engaged recesses 23 and 54 provided to at least one of the units.

(2) A configuration is also possible in which the engaged recesses 23 and 54 and the engagement projection 37 are not provided and the connection members 21 and 52 are able to slide (able to slide-displace) with respect to each of the units (regardless of clearance).

(3) In the above embodiments, the terminals 12A to 12C of the single cell 11 were configured to fasten together using bolts (a separate component) having a nut shape. However, an embodiment is not limited to this and may instead be configured such that a terminal includes a pole-shaped shaft having a thread groove on an outer circumferential surface, and may be configured such that the connecting member 21 is fixated to a terminal by fastening a nut (a separate component). In such a case, the shaft of the terminal is passed through the through-holes 22 and 53 of the connecting members 21 and 52, respectively.

(4) In the above-described embodiments, a description was given of a case where the plurality of single cells 11 are connected serially. However, an embodiment is not limited to this and may also apply to a case where the plurality of single cells 11 are connected in parallel.

(5) A number of single cells 11 configuring the cell module 10 is not limited to the number of the above-described embodiments. In addition, the shape of the cell wiring module 20 can be set as desired according to the number of single cells 11.

(6) In the above-described embodiments, with regard to the first units 56A and 56B and the second units 65A and 65B, a plurality of the positioners 63 and 67 were provided for positioning the reference position. However, with regard to the plurality of first positioners 63, the reference position may be determined by any one positioner per unit, and the other positioners of each unit may be formed within a range of a predetermined dimensional margin with respect to the positioner serving as the reference. In addition, the first units 56A and 56B and the second units 65A and 65B are not limited to including the plurality of positioners 63 and 67, respectively. Each of the units 56A, 56B, 65A, and 65B may also include only one of the positioners, respectively.

DESCRIPTION OF REFERENCE NUMERALS

10, 50 Cell module
11 Single cell
12A, 12B Electrode terminal
12C Terminal for voltage detection
20, 51 Cell wiring module
20A Linked connection unit
21 Connection member
21A Linking connection member (connection member)
21B Housed connection member (connection member)
22, 25, 53 Through-hole
23, 54 Engaged recess (engaged portion)
24 Voltage detection terminal
26, 56A, 56B First unit
26A, 26B End
27 Housing
28, 32, 59 Base plate
29, 34, 61 Dividing wall
30, 36 Holding piece
31 Holder
32 (32A, 32B), 59 (59A, 59B) Base plate
37 Engaging projection (engaging portion)
38 Detection housing 40 Opening
41 Wire through-trench
43, 65A, 65 Second unit
43A, 43B End
45, 46 Fitting projection
47, 48 Fitting recess
52 Long connection member
58 First holder
63 First positioner
66 Second holder
67 Second positioner
70 Connection unit
71 Holder
CL1, CL2 Clearance

What is claimed is:

1. A cell wiring module, comprising:
a plurality of connection members having a plate shape and connecting adjacent electrode terminals of a plurality of single cells having positive and negative electrode terminals;
a first housing having a first housing portion, wherein a first one of the connection members is housed within the first housing portion;
a second housing having a second housing portion, the first housing being different from the second housing;
a first holder provided at a side of the first housing portion and a second holder provided at a side of the second housing portion,
the first holder being defined by a first base plate and first side walls extending upwardly from an outer periphery of the first base plate and the second holder being defined by a second base plate and second side walls extending upwardly from an outer periphery of the second base plate,
wherein a second one of the connection members for connection between the first housing and the second housing is placed on the first base plate and the second base plate, the second one of the connection members being different from the first one of the connection members, and wherein the first base plate and second base plate are fitted together; and
wherein sliding occurs in a connection direction of the connection members between the second one of the connection members and at least one of the first housing and the second housing, and
the second one of the connection members include an engaged portion provided at an outer periphery of the second one of the connection members, and at least one of the first holder and the second holder includes an engagement portion provided on an inner surface of at least one of the first side walls of the first holder and the second side walls of the second holder, the engagement portion being configured to engage with the engaged portion with a predetermined clearance in the connection direction such that at least one of the first housing and second housing is displaceable relative to the connection members.

2. The cell wiring module according to claim 1, wherein the engaged portion is provided at a plurality of locations in the connection direction.

3. The cell wiring module according to claim 1, wherein one of the first housing and second housing includes a fitting projection projecting in the connection direction of the connection members, and the other of the first housing and second housing includes a fitting recess fitting together with the fitting projection.

4. The cell wiring module according to claim 1, wherein the first housing and the second housing have identical shapes.

5. The cell wiring module according to claim 1, wherein the connection members are attached to both the first housing and the second housing in a plurality of rows,
of ends of the first housing facing a side of the second housing, an end corresponding to a first row of the connection members protrudes toward the second housing more than an end corresponding to a second row of the connection members, and
of ends of the second housing facing a side of the first housing, an end corresponding to the second row of the connection members protrudes toward the first housing more than an end corresponding to the first row of connection members.

6. The cell wiring module according to claim 1, wherein the first housing and the second housing include positioners configured to position with respect to the single cells.

7. A cell wiring module, wherein the cell wiring module according to claim 1 is fixated to the single cells by inserting a pole-shaped terminal or a shaft of a bolt through a through-hole of a corresponding one of the connection members, and
the through-hole has an elliptical shape long in the connection direction of the connection members.

8. The cell wiring module according to claim 1, wherein the plurality of single cells have a flat shape and are aligned in a long axis direction of a surface having the electrode terminals, and
the connection members connect the electrode terminals adjacent to each other in the long axis direction.

9. The cell wiring module according to claim 8, wherein the plurality of single cells are aligned in a short axis direction of a surface having the electrode terminals, and
the connection members connect the electrode terminals aligned in the short axis direction.

10. The cell wiring module according to claim 1, wherein the first holder and the second holder are connected together to define a combined housing portion that surrounds the second one of the connection members.

* * * * *